INVENTOR.
NATHAN SPIELBERG
BY
AGENT

United States Patent Office 3,427,451
Patented Feb. 11, 1969

3,427,451
X-RAY DIFFRACTOMETER HAVING SEVERAL DETECTORS MOVABLE ON A GONIOMETER CIRCLE
Nathan Spielberg, Hartsdale, N.Y., assignor to North American Philips Company, Inc.
Continuation of application Ser. No. 433,283, Feb. 17, 1965. This application Feb. 2, 1968, Ser. No. 702,758
U.S. Cl. 250—51.5                                  3 Claims
Int. Cl. G01n 23/20; H01j 37/20

ABSTRACT OF THE DISCLOSURE

An X-ray diffractometer employing a plurality of electronic detectors positioned on a goniometer circle and pointed at a specimen with means to move each of the detectors and maintain it in alignment with the specimen in order to detect several reflections from the specimen simultaneously.

---

Figure 1:
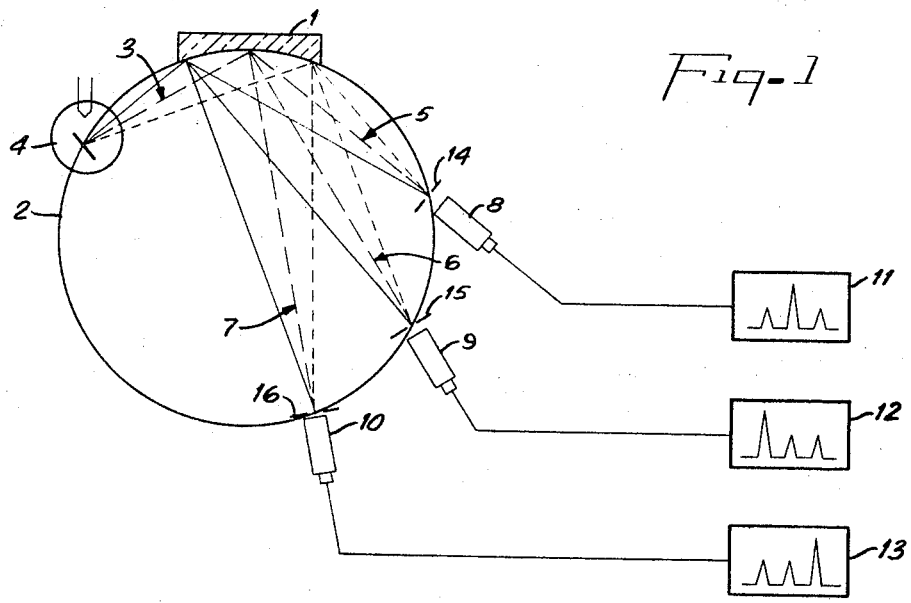

This invention is a continuation of application Ser. No. 433,283, filed Feb. 17, 1965.

My invention relates to an X-ray diffractometer for simultaneously recording different portions of an X-ray diffraction pattern.

As is well known, X-rays are reflected by crystalline materials in accordance with Bragg's law which states:

$$n\lambda = 2d \sin \theta$$

where $n$ is the order of reflection, $\lambda$ the wave length of the radiation incident upon the crystal, $d$ the spacing between crystal planes, and $\theta$ the angle between the incident ray and the normal to the reflecting plane. Since the wave length of the incident radiation is known, and the angle $\theta$ can be measured, the interplanar spacing $d$ can be calculated and thus the structure of the crystal determined.

In practice, a monochromatic beam of X-rays is directed at the specimen which is located on an arc of a circle so that the reflected rays always converge on other points of the circle, hereinafter referred to as the "focussing circle."

A film strip placed along this focussing circle is employed to record the reflected radiation from the specimen. Alternatively, a Geiger, proportional or scintillation counter which is moveable along the focussing circle in such a way as to always point at the specimen is employed to detect reflected radiation from the specimen.

While the film has the advantage that all reflections are measured simultaneously, angular measurements must be made on the film which is subject to shrinkage during processing. Consequently, allowances must be made for film shrinkage during processing which cannot be accurately measured resulting in lack of precision in the angular measurements. Furthermore, the intensities of the reflections can only be determined by the relative darkening of the film which is difficult to measure accurately. In addition, the sensitivity of detection of photographic film is not as great for the electronic detectors. Moreover, with scintillation and proportional counters various energy discrimination techniques can be employed.

While a Geiger, proportional or scintillation counter in association with appropriate measuring circuits permits greater accuracy in measuring both the angle of reflection and the intensity of each reflection, this method has the disadvantage that the detector must be moved along the arc of a circle and each reflection detected sequentially which is time consuming. Moreover it is necessary to appropriately vary for optimum recording certain geometrical parameters such as receiving slit widths as the detector is moved along the circle.

It is a principal object of my invention to provide an X-ray diffractometer in which several reflections from a specimen are detected simultaneously and the angles and intensity of each reflection measured very accurately.

It is a further object of my invention to provide an X-ray diffractometer in which a plurality of electronic detectors are employed each moveable along the focussing circle to detect reflections from a specimen also positioned on the focussing circle.

A further object of my invention is to provide an X-ray diffractometer in which each portion of the diffraction pattern can be measured with an optimum choice of receiving slit widths and electronic pulse height discriminator techniques.

These and further objects of the invention will appear as the specification progresses.

In accordance with the invention, I employ a plurality of electronic detectors, all mounted on the same goniometer, a separate guide rod being used for each detector to keep it always pointing at the specimen. Each detector is moveable along a portion of the focussing circle and detects any reflected rays from the specimen.

In a particular embodiment of the invention, the source of primary X-rays, i.e. an X-ray tube is positioned on the focussing circle. The specimen, which may be a crystalline powder held in a specimen holder is also positioned on the focussing circle to intercept primary X-rays emerging from the tube and the detectors are moveable along the focussing circle to detect X-rays which are reflected by the specimen.

Figure 2:
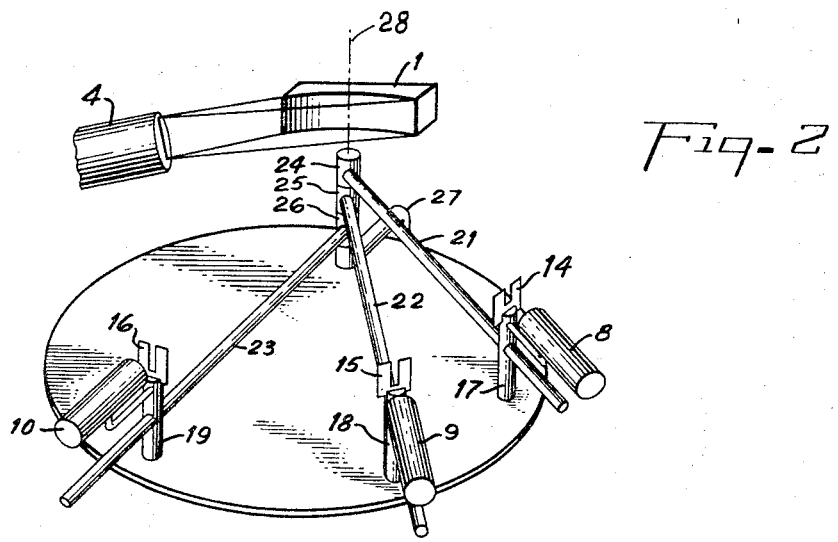

The invention will be described with reference to the accompanying drawing in which:

FIG. 1 shows an embodiment of the invention in which a plurality of detectors positioned on a focussing circle are arranged to simultaneously detect and record diffraction patterns; and FIG. 2 shows the mechanism for maintaining the proper geometrical alignment of the detectors.

Referring to the drawing, a specimen of powdered crystalline material 1 positioned on a focussing circle 2 is exposed to a beam of monochromatic primary X-ray 3 generated by an X-ray tube 4. Specimen 1 has a curvature which coincides with that of the focussing circle so that diffracted X-rays 5, 6 and 7 converge at various points on the focussing circle. Positioned around the focussing circle and pivotally mounted to point in the direction of the specimen are detectors 8, 9 and 10 respectively which detect the diffracted X-rays and record the intensities thereof on recorders 11, 12 and 13 respectively.

In order to limit the beam entering the detector, receiving slits 14, 15 and 16 are placed on the focussing circle in front of each of detectors 8, 9 and 10 respectively. Receiving slits 14, 15 and 16 are rigidly linked to their respective detectors and mounted on pivots 17, 18 and 19 which are mounted on a goniometer 20 so as to move along the focussing circle. Guide rods 21, 22 and 23 pass freely through the respective pivots 17, 18 and 19 and through colinear pivots 24, 25 and 26 which are mounted on a post 27 so that their common axis of rotation 28 lies in the center of the front surface of the specimen and perpendicular to the plane of the focussing circle. Thus, as the goniometer rotates the receiving slits and their associated detectors scan along the focussing circle and pivot so as to always point at the center of the specimen.

Thus, each detector and receiving slit scans a portion of the diffracted radiation from the specimen and the associated recorders record the diffraction pattern for a particular angular range. The receiving slit for a particular detector must be chosen of such dimensions as to be optimum for its particular angular range. All detectors are moved simultaneously thereby reducing the time to record a complete diffraction pattern for the entire angular range.

The speed at which diffraction effects is recorded is proportional to the number of detectors that are employed. The number of detectors which may be employed is limited only by the physical size of the detectors and their associated receiving slits and the requirement to fit them in the focussing circle. Thus, while I have illustrated the invention with three detectors, a larger number may be employed to record more diffraction effects simultaneously.

Therefore, while the invention has been described with reference to particular embodiments and applications thereof, other modifications will be apparent to those skilled in this art without departing from the spirit and scope of the invention as defined in the appended claims.

What is claimed is:

1. X-ray diffraction apparatus comprising a source of monochromatic X-rays, means to position a specimen of crystalline material on a focussing circle passing through said source, a plurality of detectors spatially positioned along said circle to receive and detect X-rays diffracted by said specimen and focussed on said circle, and means to move each of said detectors along said circle, said latter means further including pivot means for maintaining the detectors pointing in the direction of the specimen.

2. X-ray diffraction apparatus as claimed in claim 1 in which said means to move each of the detectors is a guide rod coupling each of said detectors, said guide rod being rotatable about an axis coincident with the surface of the specimen lying on the focussing circle and perpendicular to the plane of the circle.

3. X-ray diffraction apparatus as claimed in claim 2 in which each detector is supported by a pivot which is coupled to a guide rod whereby the detector can be pivoted to point at the specimen as the guide rod rotates about the axis coincident with the surface of the specimen.

No references cited.

RALPH G. NILSON, *Primary Examiner.*

A. L. BIRCH, *Assistant Examiner.*